(12) United States Patent
Verner

(10) Patent No.: US 9,254,786 B2
(45) Date of Patent: Feb. 9, 2016

(54) VEHICLE HORN CONTROL ASSEMBLY

(71) Applicant: Nissan North America, Inc., Franklin, TN (US)

(72) Inventor: Sarah Verner, Farmington Hills, MI (US)

(73) Assignee: NISSAN NORTH AMERICA, INC., Franklin, TN (US)

( * ) Notice: Subject to any disclaimer, the term of this patent is extended or adjusted under 35 U.S.C. 154(b) by 659 days.

(21) Appl. No.: 13/668,753

(22) Filed: Nov. 5, 2012

(65) Prior Publication Data

US 2014/0125124 A1 May 8, 2014

(51) Int. Cl.
*B60L 1/00* (2006.01)
*B60Q 5/00* (2006.01)

(52) U.S. Cl.
CPC ...................... *B60Q 5/003* (2013.01)

(58) Field of Classification Search
CPC .. B60Q 5/001; B60Q 5/003; B60R 21/01516; B60R 21/0132
See application file for complete search history.

(56) References Cited

U.S. PATENT DOCUMENTS

| 5,423,569 | A | 6/1995 | Reighard et al. |
| 5,463,258 | A | 10/1995 | Filion et al. |
| 5,489,806 | A | 2/1996 | Harris et al. |
| 5,539,259 | A | 7/1996 | Filion et al. |
| 5,639,908 | A | 6/1997 | Lai |
| 5,723,834 | A | 3/1998 | Hambleton, Jr. et al. |
| 5,965,952 | A | 10/1999 | Podoloff et al. |
| 6,236,301 | B1 | 5/2001 | Langford et al. |
| 6,236,309 | B1 | 5/2001 | Haag et al. |
| 6,320,147 | B1 | 11/2001 | Simpson |
| 6,435,546 | B1* | 8/2002 | Scherer et al. ................ 280/731 |
| 2004/0263316 | A1* | 12/2004 | Dix et al. ..................... 340/5.23 |
| 2011/0210867 | A1* | 9/2011 | Benedikt ....................... 340/905 |
| 2011/0241850 | A1 | 10/2011 | Bosch et al. |
| 2011/0246028 | A1* | 10/2011 | Lisseman et al. .............. 701/45 |
| 2012/0200409 | A1 | 8/2012 | Hill |
| 2012/0286970 | A1 | 11/2012 | Castillo |

FOREIGN PATENT DOCUMENTS

| GB | 2 281 956 A | 3/1995 |
| JP | 02-074432 A | 3/1990 |
| WO | WO-2010/037462 A1 | 4/2010 |

* cited by examiner

*Primary Examiner* — Jared Fureman
*Assistant Examiner* — Rafael Pacheco
(74) *Attorney, Agent, or Firm* — Global IP Counselors, LLP

(57) ABSTRACT

A vehicle horn control assembly comprises a sensor assembly and a controller. The sensor assembly has a sensor array that includes a plurality of sensor zones, with each of the sensor zones being configured to output a respective pressure signal in response to a respective amount of force applied thereto. The controller is configured to determine, based on the respective pressure signals output over a period of time, a touching characteristic representing a manner in which a user touches the sensor assembly to activate a vehicle horn. The controller is further configured to set a respective pressure threshold for each of the sensor zones above which the controller activates the vehicle horn based on the touching characteristic.

20 Claims, 4 Drawing Sheets

VEHICLE HORN CONTROL ASSEMBLY

BACKGROUND

1. Field of the Invention

The present invention generally relates to a vehicle horn control assembly. More specifically, the present invention relates to a vehicle horn control assembly having a plurality of horn operating tactile sensor zones that can be set to operate at different contact thresholds based on the touching characteristics of individual users.

2. Background Information

Vehicles such as automobiles, trucks, SUVs and so on are equipped with a horn or other type of warning system. A horn control assembly for activating the horn is mounted in the steering wheel, and is typically at a central location on the steering wheel. The horn control assembly is activated by sensed contact between two or more solid components that is generated when a driver applies sufficient force to the steering wheel. Therefore, the driver can easily activate the horn by applying pressure to the horn control assembly while maintaining their hands on the steering wheel, and thus maintaining steering control of the vehicle.

However, conventional horn control assemblies may accidentally be triggered to sound the horn if the driver inadvertently depresses the horn control assembly during normal driving operations, when entering or leaving the vehicle, and so on. Additionally, conventional horn control assemblies can become overly difficult to trigger in the event that underlying mounting structures such as springs become damaged or are inadvertently omitted from the assembly. Accordingly, a need exists for an improved horn control assembly.

SUMMARY

In view of the state of the known technology, one aspect of the present invention is to provide a vehicle horn control assembly comprising a sensor assembly and a controller. The sensor assembly has a sensory array that includes a plurality of sensor zones, with each of the sensor zones being configured to output a respective pressure signal in response to a respective amount of force applied thereto. The controller is configured to determine, based on the respective pressure signals output over a period of time, a touching characteristic representing a manner in which a user touches the sensor assembly to activate a vehicle horn. The controller is further configured to set a respective pressure threshold for each of the sensor zones above which the controller activates the vehicle horn based on the touching characteristic.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
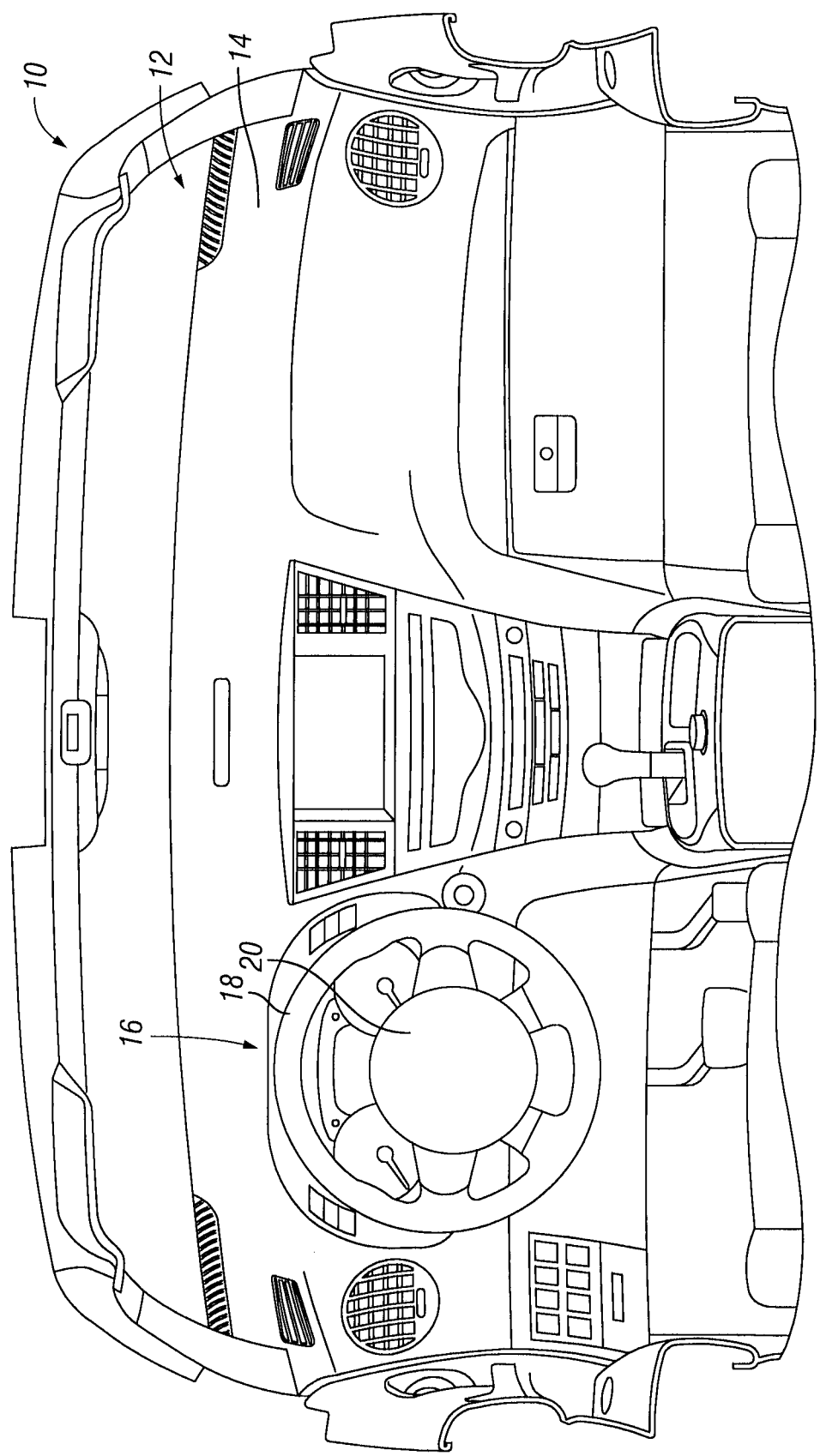
FIG. 1 is an exemplary view of an interior passenger compartment of a vehicle employing a horn control assembly according to a disclosed embodiment.

Referring initially to FIG. 1, a vehicle 10 such as an automobile, truck, van, SUV and so on includes a passenger compartment 12. A vehicle dash 14 is typically positioned toward the front of the passenger compartment 12. The vehicle 10 further includes a steering assembly 16 for controlling the steering direction of the vehicle 10. The steering assembly 16 includes a steering wheel 18 and a horn activation apparatus, which is referred to herein as a sensor assembly 20. Typically, the sensor assembly 20 is positioned at or near the center of the steering wheel 18 as part of a vehicle horn control assembly as discussed herein. However, the sensor assembly 20 can be positioned at any appropriate location on the steering wheel 18. Naturally, a sensor assembly 20 can be positioned at any suitable location on the steering wheel 18, and at least one additional sensor assembly 20 can be positioned at a suitable location in the passenger compartment 12.

Figure 2:
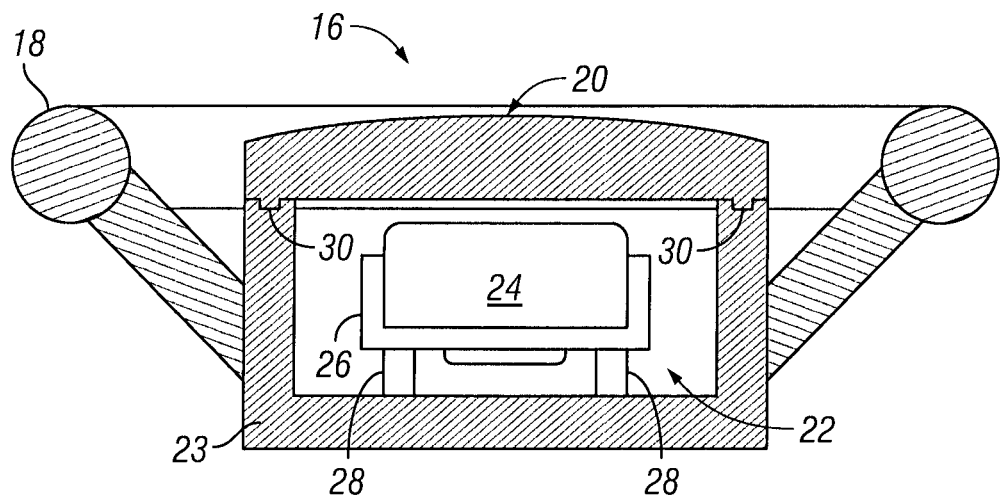
FIG. 2 is a cross-sectional view of a steering wheel assembly as shown in FIG. 1 which employs components of the horn control assembly.

As further shown in FIG. 2, the steering assembly 16 of the vehicle 10 will typically include an airbag assembly 22 mounted to a steering housing 23. As understood in the art, the airbag assembly 22 includes an airbag 24 that is deployed upon detection of rapid vehicle deceleration such as during an impact event. The airbag assembly 22 further includes an airbag housing 26 that retains the airbag 24. Also in this example, mounting structures 28 mount the airbag housing 26 to the steering housing 23. Furthermore, the sensor assembly 20 is mounted to the steering housing 23 above the airbag assembly 22 via mounting structures 30. For example, the mounting structures 30 can include a plurality of posts or other conventional fastening means such as clips, bolts, or adhesives. Also, portions along the perimeter of the sensor assembly 20 can be integrally formed with the steering housing 23 or otherwise configured to mate with the steering housing 23 such that any seams are inconspicuous or concealed.

As further shown schematically in FIGS. 3 and 4, the sensor assembly 20 includes an outer skin 31 and a sensor array 32 as discussed in more detail below. The outer skin 31 comprises a material that can be similar or identical to that of the vehicle dash 14 in order to achieve a uniform interior trim appearance. The sensor array 32 is adhered to or otherwise fixed to the outer skin 31 such that forces applied to the outer skin 31 are transferred to the sensor array 32. Also, the vehicle horn control assembly includes a controller 34. The controller 34 preferably includes a microcomputer with a control program that controls the vehicle horn control assembly as discussed herein. The controller 34 includes other conventional components such as an input interface circuit, an output interface circuit, and storage devices such as a ROM (Read Only Memory) device and a RAM (Random Access Memory) device. The microcomputer of the controller 34 is at least programmed to control the vehicle horn control assembly in accordance with the flow charts of FIGS. 6 and 7 as discussed below. It will be apparent to those skilled in the art from this disclosure that the precise structure and algorithms for the controller 34 can be any combination of hardware and software that will carry out the functions of the present invention. In other words, "means plus function" clauses as utilized in the specification and claims should include any structure or hardware and/or algorithm or software that can be utilized to carry out the function of the "means plus function" clause.

Figure 3:
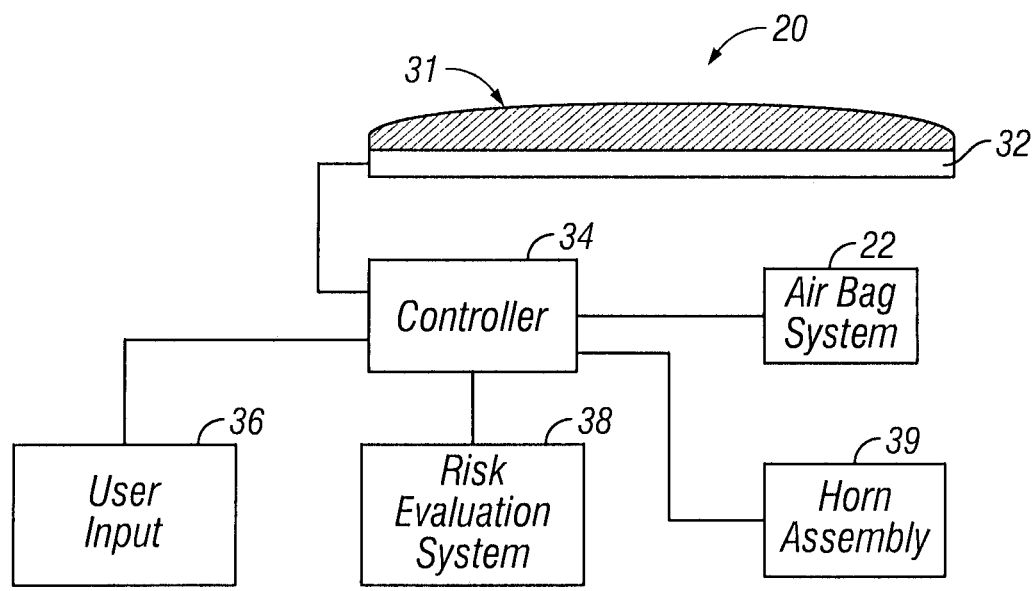
FIG. 3 is an exemplary schematic view of components of the horn control assembly shown in FIGS. 1 and 2.

As further shown in FIG. 3, the air bag system 22 is coupled to the controller 34 such that the controller 34 can control deployment of the airbag when rapid deceleration of the vehicle 10 is detected. In addition, a user input device 36 is electrically coupled to the controller 34 to communicate with the controller 34. The user input device 36 can be configured as and/or include a user identification device that is configured to determine an identity of the user. For example, as understood in the art, the user identification device can include a key sensing device that is configured to receive information from an intelligent key or key fob used by the user, such that the controller 34 is operable to determine the identity of the user based on the information. Also, the user identification device can include an input device that is configured to receive information input by the user, such that the controller 34 can determine the identity of the user based on the information. The input device can include a tactile input device, such as one or more buttons via which a user can enter user identification information, a sound input device in which a user can audibly enter the user identification information, or both. Naturally, the user input device 36 can include any suitable type of device that enables user identification information to be entered and received by the controller 34.

As further shown, a risk evaluation system 38 can be electrically coupled to the controller 34. The risk evaluation system 38 is configured to determine when the manner in which the vehicle 10 is currently being operated and/or the proximity of obstacles outside of the vehicle 10 creates a high risk scenario for occupants of the vehicle 10. As understood in the art, the risk evaluation system 38 can include obstacle proximity sensors, accelerometers, steering wheel angle sensors, vehicle speed sensors, accelerator pedal position sensors, brake pedal position sensors, or any other suitable component or system that is capable of indicating a high risk scenario for occupants in the vehicle 10. Finally, a horn assembly 39 is electrically coupled to the controller 34. The controller 34 can instruct the horn assembly 39 to emit an audible warning when the controller 34 detects driver contact with the sensor assembly 20 above a prescribed threshold, as described in further detail below. The controller 34 can also perform other functions, such as controlling heating of the steering wheel 18 and so on.

Figure 4:
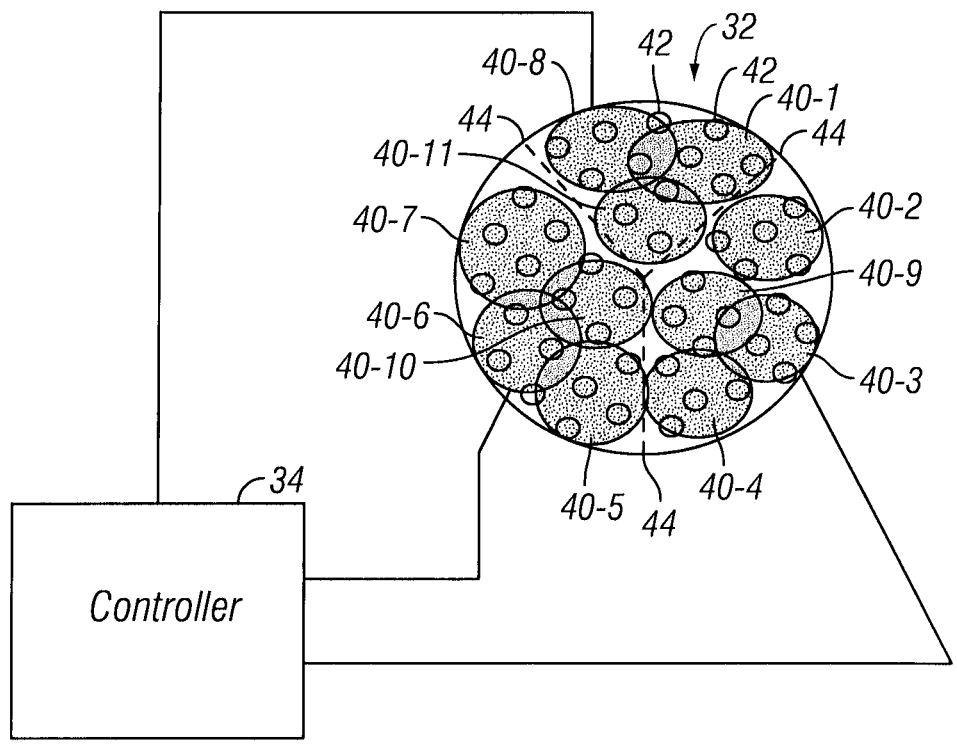
FIG. 4 is a further exemplary schematic view illustrating sensor zones of the horn control assembly as shown in FIGS. 1 through 3.

As shown specifically in FIG. 4, the sensor array 32 of the sensor assembly 20 includes a plurality of sensor zones that can collectively be referred to as sensor zones 40. In this example, the sensor array 32 includes sensor zones 40-1 through 40-11. However, the sensor assembly 20 can include any suitable number of sensor zones 40 arranged in any suitable manner.

Figure 5:
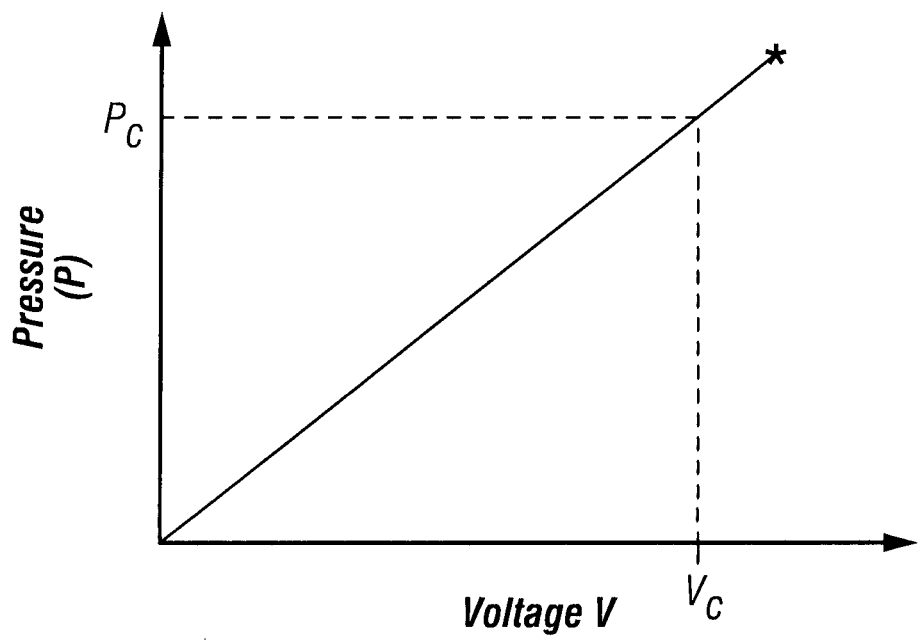
FIG. 5 is a graph illustrating an exemplary relationship between a force-induced pressure applied to a sensor zone of the horn control assembly and a voltage generated based on the applied pressure.

In this example, each of the sensor zones 40 includes a respective arrangement of sensors 42 that are electrically coupled to the controller 34. The number of sensors 42 in each of the sensor zones 40 can be a single sensor 42 up to any suitable amount of sensors 42. In this example, each of the sensor zones 40 includes five sensors 42. However, the sensor zones 40 can have different numbers of sensors 42. In this example, each of the sensor zones 40 can include one or more tactile sensors as known in the art. As understood in the art and as illustrated in FIG. 5, as the force-induced pressure applied to a tactile sensor 42 is increased, the voltage output by that tactile sensor can also be configured to increase proportionately. For instance, the sensors 42 can each be a piezo-electric element or any other suitable type of sensor (e.g., strain gauge, capacitance sensor, or force sensor) that generates a voltage when a strain is imposed on the element. The use of these types of sensors 42 eliminates the need for "floating" airbag modules having spring-type connections to the steering wheel 18, which are typically found in conventional driver airbag modules.

The increase in output voltage can be linear in response to an increase in applied pressure, or can have any suitable relationship to the applied pressure as understood in the art. Therefore, as discussed in more detail below, each of the sensor zones 40 can be configured to output a respective pressure signal having a value that is proportionate to the amount of pressure applied thereto.

As further shown in FIG. 4, a membrane or other suitable material that interconnects the sensor zones 40 of the sensor array 32 includes a plurality of tear seams 44. The tear seams 44 are configured to separate upon deployment of the airbag 24 in the airbag assembly 22. The tear seams 44 can be arranged to demarcate each of the sensor zones 40 or groups of the sensor zones 40. The sensors 42, which can be tactile sensors as discussed above, can be embedded in the membrane of the sensor array 32 at positions separated from the tear seams 44. Thus, the sensors 42 can still be configured to operate the horn even after the airbag 24 has been deployed.

Figure 7:
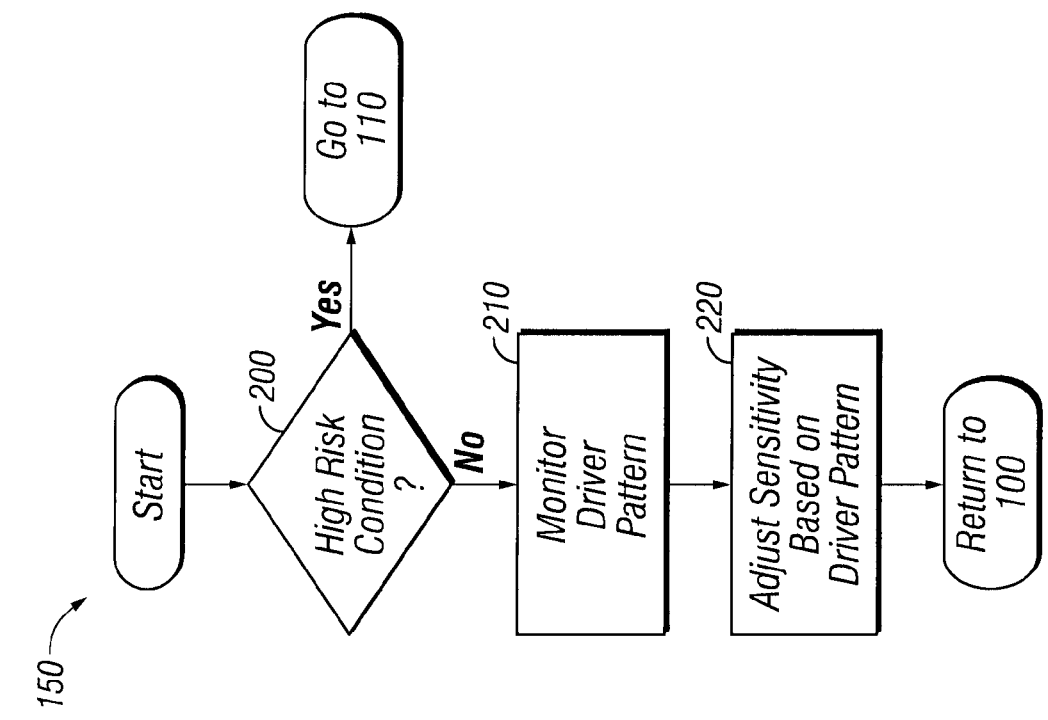
FIG. 7 is a flowchart illustrating an example of operations performed by the horn control assembly to set pressure thresholds for the sensor zones above which the horn is activated.
Figure 6:
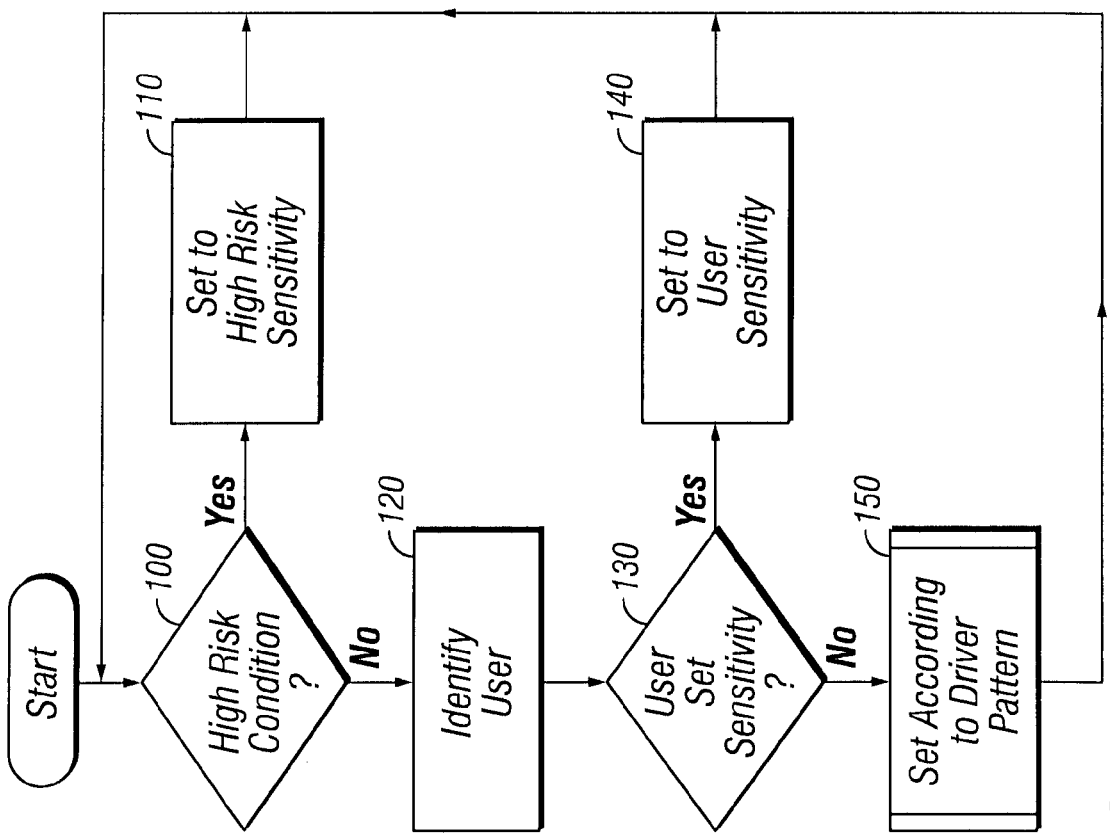
FIG. 6 is a flowchart illustrating an example of operations performed by the horn control assembly.

An example of the functionality of the vehicle horn control assembly described herein will now be discussed with regard to FIGS. 6 and 7. As shown in FIG. 6, when the control operation begins, the controller 34 can set the threshold levels for the pressure signals at which the controller 34 instructs the horn assembly 39 to emit an audible warning to be equal for each of the sensors 42. These threshold levels can be any suitable pressure levels as understood in the art.

If the controller 34 detects a high risk condition in step 100 as determined by feedback from the risk evaluation system 38, the controller 34 in step 110 can set the respective pressure thresholds for all of the sensor zones 40 to be at a high risk sensitivity threshold. For example, the risk evaluation system 38 can detect a high risk condition by detecting an obstacle in the path of the vehicle 10, sudden deceleration of the vehicle (e.g., hard braking), erratic steering operation, hard or extreme acceleration, high vehicle speed, and so on. The high risk sensitivity threshold is a lowest pressure threshold for all of the sensor zones 40 such that a minimal application of force by the driver is required in each of the sensor zones 40 in order to activate the horn.

If no high risk condition is detected, the processing continues to step 120 where the controller 34 detects and stores information pertaining to the identity of the user that can be entered in any suitable manner as discussed above. The processing can then proceed to step 130 where the controller 34 determines if the user has entered any specific sensitivity setting via the user input device 36. Also, in step 130, the controller 34 can determine whether a user sensitivity profile was previously determined. That is, the controller 34 can retrieve the touching characteristic associated with the identity of the user from the memory in response to an input from the user. In either event, in step 150, the controller 34 can set the sensitivity thresholds for the sensor zones 40 based on the user identity and the associated touching characteristic retrieved from the memory.

However, if the user has not set a particular sensitivity setting or no previously determined user sensitivity profile exists, the processing proceeds to step 150 during which the controller 34 determines the sensitivity profile for the user. As shown in FIG. 7, if the controller 34 detects a high risk condition in step 200, the processing continues to step 110 where the controller 34 sets the high risk thresholds as discussed above. However, if no high risk condition has been detected, the processing continues to step 210 where the controller 34 monitors the touching pattern of the user over a period of time.

That is, the controller 34 determines, based on the respective pressure signals output by the individual sensors 42 in the sensor zones 40 over a period of time, a touching characteristic representing a manner in which a user typically touches the sensor assembly 20 to activate the vehicle horn 24 in step 210. In step 220, the controller 32 thus sets each respective pressure threshold for each sensor zone 40, or for each specific sensor 42 in each sensor zone 40, based on the user touching characteristic.

For example, the controller 34 can set one of the respective pressure thresholds less than any of the other respective pressure thresholds based on the touching characteristic to increase pressure sensitivity of the sensor zone 40 associated with that respective pressure threshold. That is, the controller 34 can determine the touching characteristic by determining whether the user has touched one of the sensor zones 40 more frequently than the other of the sensor zones 40 during the period of time, such as several minutes, one or more hours, several days, or any suitable period of time. The touching characteristic thus represents locations at which the user touches the sensor assembly with respect to positions on the vehicle steering wheel to activate the vehicle horn 24.

For instance, if the user typically touches the sensor zones 40 located at a 2 o'clock position on the sensor assembly 20 when the user intends to activate the horn, the controller 34 can set the threshold such that even a slight pressure applied to the sensors 42 of the sensor array 32 at the 2 o'clock position will activate the horn. In other words, the sensitivity of all of the sensor zones 40 can be at the minimum sensitivity acceptable in the automotive field, and can be made more sensitive based on the touching characteristic. Thus, the controller 34 is configured to set the respective pressure threshold for a particular one of the sensor zones 40 or multiple sensor zones 40 to be less than the respective pressure thresholds of other sensor zones 40 based on the touching characteristic, thus increasing pressure sensitivity in those target sensor zones 40. The controller 34 can thus store the touching characteristic associated with the identity of the user in a memory. Additionally or alternatively, the controller 34 can set one of the respective pressure thresholds to be higher than a default pressure threshold for the remaining sensor zones 40 in order to reduce unintentional operation of the vehicle horn.

The learning process discussed above can thus be repeated as necessary or desired on a regular basis. The controller 34 can thus determine, based on the respective pressure signals output over another period of time, a different touching characteristic representing a different manner in which the same or another user touches the sensor assembly 20 to activate the vehicle horn. The controller 34 can thus set each respective pressure threshold based on the different touching characteristic. This allows the system to continuously adapt over time to different drivers and/or to the changing driving habits of individual drivers. In any case, the controller 34 maintains a minimum pressure threshold for all potential users that is compliant with design and/or regulatory standards.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiments, the following directional terms "forward", "rearward", "above", "downward", "vertical", "horizontal", "below" and "transverse" as well as any other similar directional terms refer to those directions of a vehicle equipped with the vehicle body structure. Accordingly, these terms, as utilized to describe the present invention should be interpreted relative to a vehicle equipped with the vehicle body structure. The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A vehicle horn control assembly comprising:
   a sensor assembly having a sensor array that includes a plurality of sensor zones, each of the sensor zones being configured to output a respective pressure signal in response to a respective amount of force applied thereto; and
   a controller configured to determine, based on the respective pressure signals output over a period of time, a touching characteristic representing a manner in which a user touches the sensor assembly to activate a vehicle horn, the controller being further configured to set a respective pressure threshold for each of the sensor zones above which the controller activates the vehicle horn based on the touching characteristic.

2. The vehicle horn control assembly according to claim 1, wherein
   the controller is configured to set one of the respective pressure thresholds less than any of the other respective pressure thresholds based on the touching characteristic to increase pressure sensitivity of the sensor zone associated with the one of the respective pressure thresholds.

3. The vehicle horn control assembly according to claim 1, wherein
the controller is configured to determine the touching characteristic by determining whether the user has touched one of the sensor zones more frequently than any of the other sensor zones during the period of time.

4. The vehicle horn control assembly according to claim 1, wherein
the controller is configured to set one of the respective pressure thresholds higher than any of the other respective pressure thresholds based on the touching characteristic to decrease pressure sensitivity of the sensor zone associated with the one of the respective pressure thresholds.

5. The vehicle horn control assembly according to claim 1, wherein
the sensor assembly includes a mounting structure configured to mount the sensor assembly to a steering wheel assembly.

6. The vehicle horn control assembly according to claim 5, wherein
the touching characteristic represents particular locations on the steering wheel assembly at which the user frequently touches the sensor assembly in order to activate the vehicle horn while the touching is occurring.

7. The vehicle horn control assembly according to claim 5, wherein
the mounting structure is configured to mount the sensor assembly at a location on the steering wheel assembly covering an airbag assembly mounted within a steering housing of the steering wheel assembly.

8. The vehicle horn control assembly according to claim 7, wherein
the sensor array includes a membrane interconnecting the sensor zones and including a plurality of tear seams demarcating the sensor zones, the tear seams being configured to separate upon deployment of an airbag of the airbag assembly.

9. The vehicle horn control assembly according to claim 1, wherein
each of the sensor zones includes a respective sensor arrangement electrically coupled to the controller.

10. The vehicle horn control assembly according to claim 9, wherein
each of the sensor arrangements includes a plurality of tactile sensors.

11. The vehicle horn control assembly according to claim 8, wherein
the sensor array further includes a plurality of tactile sensors embedded in the membrane at each of the sensor zones and at positions separated from the tear seams.

12. The vehicle horn control assembly according to claim 8, further comprising
a user identification device configured to determine an identity of the user, the controller being further configured to store the touching characteristic associated with the identity of the user in a memory.

13. The vehicle horn control assembly according to claim 12, wherein
the user identification device includes a key sensing device configured to receive information from an intelligent key carried by the user, the controller being further configured to determine the identity of the user based on the information.

14. The vehicle horn control assembly according to claim 12, wherein
the user identification device includes an input device configured to receive information input by the user, the controller being further configured to determine the identity of the user based on the information.

15. The vehicle horn control assembly according to claim 14, wherein
the input device includes at least one of a tactile input device and a sound input device.

16. The vehicle horn control assembly according to claim 12, wherein
the controller is further configured to retrieve the touching characteristic associated with the identity of the user from the memory in response to an input from the user, the controller setting each of the respective pressure thresholds based on the touching characteristic retrieved from the memory.

17. The vehicle horn control assembly according to claim 1, wherein
the controller is further configured to determine, based on the respective pressure signals output over another period of time, a different touching characteristic representing a different manner in which a user touches the sensor assembly to activate the vehicle horn, the controller being further configured to set each respective pressure threshold based on the different touching characteristic.

18. A vehicle horn control assembly comprising
a sensor assembly having a sensor array that includes a plurality of sensor zones, each of the sensor zones being configured to output a respective pressure signal in response to a respective amount of force applied thereto;
a risk evaluation system configured to determine a high risk condition of the vehicle; and
a controller configured to determine, based on the respective pressure signals output over a period of time, a touching characteristic representing a manner in which a user touches the sensor assembly to activate a vehicle horn, the controller being further configured to set a respective pressure threshold for each of the sensor zones above which the controller activates the vehicle horn based on the touching characteristic and to set the respective pressure thresholds for all of the sensor zones to be at a high risk sensitivity threshold in response to the high risk condition being determined by the risk evaluation system.

19. The vehicle horn control assembly according to claim 18, wherein
the high risk sensitivity threshold is a lowest pressure threshold for all of the sensor zones.

20. The vehicle horn control assembly according to claim 18, wherein
the risk evaluation system includes at least one of an obstacle proximity sensor, an accelerometer, a steering wheel angle sensor, a vehicle speed sensor, and accelerator pedal position sensor, and a brake pedal position sensor configured to detect the high risk condition.

* * * * *